United States Patent
Sohara et al.

(10) Patent No.: US 10,400,395 B2
(45) Date of Patent: Sep. 3, 2019

(54) PROCESS FOR PREPARING A PCC COMPOSITE PRODUCT

(71) Applicant: SPECIALTY MINERALS (MICHIGAN) INC., Bingham Farms, MI (US)

(72) Inventors: Joseph Andrew Sohara, Northampton, PA (US); Ari Aari, Parainen (FI)

(73) Assignee: Specialty Minerals (Michigan) Inc., Bingham Farms, MI (US)

( * ) Notice: Subject to any disclaimer, the term of this patent is extended or adjusted under 35 U.S.C. 154(b) by 76 days.

(21) Appl. No.: 15/514,481

(22) PCT Filed: Sep. 24, 2015

(86) PCT No.: PCT/US2015/051998
§ 371 (c)(1),
(2) Date: Mar. 24, 2017

(87) PCT Pub. No.: WO2016/053755
PCT Pub. Date: Apr. 7, 2016

(65) Prior Publication Data
US 2017/0247840 A1   Aug. 31, 2017

Related U.S. Application Data

(60) Provisional application No. 62/057,045, filed on Sep. 29, 2014.

(51) Int. Cl.
| | |
|---|---|
| *D21H 17/67* | (2006.01) |
| *C09C 1/02* | (2006.01) |
| *C01F 11/04* | (2006.01) |
| *C01F 11/18* | (2006.01) |
| *D21H 19/38* | (2006.01) |

(52) U.S. Cl.
CPC .......... *D21H 17/675* (2013.01); *C01F 11/04* (2013.01); *C01F 11/181* (2013.01); *C09C 1/021* (2013.01); *D21H 19/385* (2013.01); *C01P 2004/61* (2013.01); *C01P 2004/62* (2013.01)

(58) Field of Classification Search
None
See application file for complete search history.

(56) References Cited

U.S. PATENT DOCUMENTS

| | | | |
|---|---|---|---|
| 5,759,258 A | 6/1998 | Sohara et al. | |
| 5,846,378 A | 12/1998 | Phipps | |
| 6,063,237 A | 5/2000 | Adams et al. | |
| 6,830,615 B2 | 12/2004 | Lyons et al. | |
| 8,747,543 B2 | 6/2014 | Smith et al. | |
| 2008/0005337 A1 | 1/2008 | Nishimura et al. | |
| 2008/0053337 A1 | 3/2008 | Sohara et al. | |
| 2012/0328497 A1 | 12/2012 | Higgs | |
| 2013/0129601 A1 | 5/2013 | Sohara et al. | |
| 2014/0000485 A1 | 1/2014 | Smith et al. | |

FOREIGN PATENT DOCUMENTS

| | | | |
|---|---|---|---|
| EP | 2085366 A2 * | 8/2009 | ............ C04B 18/08 |
| JP | 2010-077555 | 4/2010 | |
| WO | WO 96/28517 A1 | 9/1996 | |

OTHER PUBLICATIONS

International Search Report and Written Opinion dated Dec. 8, 2015 for Application No. PCT/US2015/051998, 12 pages.

\* cited by examiner

*Primary Examiner* — Colleen P Dunn
*Assistant Examiner* — Ross J Christie
(74) *Attorney, Agent, or Firm* — Squire Patton Boggs (US) LLP

(57) ABSTRACT

The current invention relates to methods of the recovery and re-use of minerals obtained from the combustion of the residues of a process to recycle paper.

25 Claims, No Drawings

PROCESS FOR PREPARING A PCC COMPOSITE PRODUCT

CROSS-REFERENCE TO RELATED APPLICATIONS

This application is a 35 U.S.C. § 371 National Stage entry of International Application No. PCT/US2015/051998, filed on Sep. 24, 2015, and International Application No. PCT/US2015/051998 claims priority to and claims the benefit of, and hereby incorporates by reference as if fully set forth, expressly including any drawings, U.S. provisional patent application No. 62/057,045, filed on Sep. 29, 2014.

FIELD

The present invention relates to the recovery and re-use of minerals obtained from the combustion of the residues of a process to recycle paper.

BACKGROUND

The recycling of wastepaper involves separation of usable pulp fiber from the other components of the wastepaper, such as mineral fillers, printing inks, laser toner particles, adhesives, etc. This is done through a series of steps that may be carried out in any way that is suitable to the purpose of the deinking plant and its customers. The desired product of this deinking process is deinked pulp (DIP).

Regardless of the deinking process employed, a composite waste material, sometimes called sludge or, alternatively, deinking residue (DIR), is produced with the DIP, and this DIR must be disposed or re-used in some fashion. DIR is comprised of three primary components: 1) fibers and other organic species, 2) inorganic species including minerals that are present as filling or coating pigments in the wastepaper, and 3) water. It is the preferred practice of some deinking plants to burn the DIR, which has a useful calorific value, to produce energy and steam. Burning the DIR simultaneously reduces the mass of solid waste that must be disposed or reused and converts it entirely to a mixture of inorganic minerals in an essentially dry state.

Some methods of treating DIR are described U.S. Pat. Nos. 5,759,258, 5,846,378, 6,063,237, and 6,830,615. However, a need exists for a process to produce pigments for paper which utilizes recovered DIR and which requires limited milling or no milling.

INCORPORATION BY REFERENCE

All publications, patents, and patent applications mentioned in this specification are herein incorporated by reference to the same extent as if each individual publication, patent, or patent application was specifically and individually indicated to be incorporated by reference, and as if each said individual publication, patent, or patent application was fully set forth, including any figures, herein. If a definition in an incorporated document conflicts with a definition in this document, the definition in this document controls.

SUMMARY

Embodiments of the present invention encompass methods to recover and re-use minerals obtained from the combustion of the residues of a process to recycle paper.

Embodiments of the present invention encompass a process for making composite precipitated calcium carbonate particles where the process includes: obtaining or providing ash particles, at least 25 wt % of the ash particles, on a dry basis, comprising CaO; wherein the wt % of CaO is determined by X-ray diffraction; and wherein the ash particles are the product of incineration; forming an aqueous slurry of the ash particles, wherein the water used to form the slurry, prior to addition of any optional additives, comprises not more than 500 mg/liter elemental calcium; and carbonating the aqueous slurry to form composite precipitated calcium carbonate particles; wherein no wet milling is performed. In some embodiments, the only sources of calcium are from the ash particles and the water used in forming the slurry of the ash particles; and no source calcium is added to either of the material to be incinerated, or to the incinerator. In some embodiments a source of calcium is added to the material to be incinerated, to the incinerator, to both the incinerator and material to be incinerated, at another point in the process, or a combination thereof, such that the ratio of the weight of calcium added, expressed as elemental calcium, to the weight of ash, is not more than 1.0.

DETAILED DESCRIPTION

Use of the singular herein includes the plural and vice versa unless expressly stated to be otherwise. That is, "a" and "the" refer to one or more of whatever the word modifies. For example, "a particle" may refer to one particle, two particles, etc. Likewise, "the compound" may refer to one, two or more compounds. By the same token, words such as, without limitation, "compounds" would refer to one compound as well as to a plurality of compounds unless it is expressly stated or obvious from the context that such is not intended.

As used herein, unless specifically defined otherwise, any words of approximation such as without limitation, "about," "essentially," "substantially," and the like mean that the element so modified need not be exactly what is described but can vary from the description. The extent to which the description may vary will depend on how great a change can be instituted and have one of ordinary skill in the art recognize the modified version as still having the properties, characteristics and capabilities of the unmodified word or phrase. With the preceding discussion in mind, a numerical value herein that is modified by a word of approximation may vary from the stated value by ±15% in some embodiments, by ±10% in some embodiments, by ±5% in some embodiments, or in some embodiments, may be within the 95% confidence interval.

As used herein, any ranges presented are inclusive of the end-points. For example, "a temperature between 10° C. and 30° C." or "a temperature from 10° C. to 30° C." includes 10° C. and 30° C., as well as any temperature in between. In addition, throughout this disclosure, various aspects of this invention may be presented in a range format. The description in range format is merely for convenience and brevity and should not be construed as an inflexible limitation on the scope of the invention. Accordingly, the description of a range should be considered to have specifically disclosed all the possible subranges as well as individual numerical values within that range. As an example, a description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. Unless expressly indicated, or from the context clearly limited to integers, a description of a range such as from 1 to 6 should be considered to have specifically disclosed subranges 1.5 to 5.5, etc., and individual values such as 3.25, etc. that is non-integer individual values and ranges beginning with, ending with or both beginning with and ending with a non-integer value(s). This applies regardless of the breadth of the range.

As used herein, the use of "preferred," "preferably," or "more preferred," and the like to modify an aspect of the invention refers to preferences as they existed at the time of filing of the patent application.

As used herein, "optional" means that the element modified by the term may or may not be present.

As used herein, "on a dry basis," refers to not more than 1.0 weight % water (or other solvent) in some embodiments, not more than 0.5 weight % water (or other solvent) in some embodiments, or not more than 0.2 weight % water (or other solvent) in some embodiments.

As used herein, "expressed as elemental calcium," refers to the equivalent quantity of elemental calcium. For example, 100.0869 grams of $CaCO_3$ contains 40.078 grams of elemental calcium.

As used herein, an "aqueous solution" is water, and optionally a second miscible solvent, with one or more materials dissolved in the water, or the water/second solvent(s) blend. In preferred embodiments, there is no second solvent.

As used herein, an "aqueous dispersion" is water, and optionally a second miscible solvent, with one or more materials dispersed in the water or the water/second solvent(s) blend, and optionally, one or more materials dissolved in the water, or the water/second solvent(s) blend. In preferred embodiments, there is no second solvent.

As used herein, "particle" is a piece of matter held together by physical bonding of molecules, an agglomeration of pieces of matter ("particles") held together by colloidal forces and/or surface forces, a piece of matter which is held together by chemical bonds such as a cross-linked polymer network, a piece of matter formed by ionic interactions, or a piece of matter held together by any combination of agglomeration, surface forces, colloidal forces, ionic interactions, and chemical bonds. For the purposes of this disclosure, a particle will be defined as ranging in size from less than a one tenth of a nanometer to several centimeters in size.

The polydispersity of a plurality of particles represents the distribution of sizes, usually expressed as particle diameters, within a plurality of particles. The average diameter can be a number average diameter, where the number average diameter=$\Sigma_i\, d_i n_i / \Sigma_i\, n_i$ where $n_i$ represents the number of particles with a diameter represented by $d_i$. Usually approximations are made and the distribution of particles by diameters is represented as a histogram, or in other words the particles are divided into smaller groups encompassing a smaller range of diameters and each of these groups is assigned a diameter near the center of that range. The surface area average diameter is determined by $(\Sigma_i\, f_i d_i^2)^{1/2}$, and the volume or mass average diameter is determined by $(\Sigma_i\, f_i d_i^3)^{1/3}$, where $f_i$ is $n_i/\Sigma_i\, n_i$. Thus, in the case of the surface area average, the weighting factor is the surface area represented by the class of particles of diameter $d_i$ while for the volume average diameter, the weighting factor is the volume represented by each class of particles of diameter $d_i$. Since the surface area increases with diameter squared and the volume increases with diameter cubed, the surface area average diameter is greater than the number average diameter. Likewise, the volume average diameter exceeds the surface area diameter. The mass or weight average diameter is the same as the volume average diameter if the density of all of the particles is the same. Similarly, distributions of particle sizes may be based on the number, surface area, or volume of the particles.

The distribution of the particle sizes in a plurality may be represented by the standard deviation, which is a well-known statistical measurement. The standard deviation may be suitable for a narrow particle size distribution. Other measures of polydispersity include the d10 and d90 which refer to the diameters representing the threshold where 10% of the distribution falls below, and 90% of the distribution falls below, respectively. The average may be referred to as a d50. Thus, for a number average, half or 50% of the number of particles have a diameter less than the d50. For a volume average diameter, the d50 represents the diameter where half the volume represented by the plurality is in particles having a diameter smaller than d50, or in other words, the intersection of the 50% line on a plot of the cumulative volume of the particles as a function of diameter.

As used herein, if not otherwise specified, the average particle diameter will refer to the diameter determined by a sedimentation method, which is based on the assumption that the particles observed are spherical, and if expressed as a mass average, of constant density. The sedimentation method of determining particle size distribution measures the time for a particle to settle a known distance in a fluid of known viscosity and density of a group of particles. The hydrodynamic diameter or the Stokes diameter based on diffusion measurements, and may include solvent associated with the particle. For non-spherical particles, the reported "diameter" is actually the effective diameter, which is the diameter of a sphere with the equivalent hydrodynamic radius. Typically, a particle density is assumed and the results reported as diameter vs. mass fraction of the sample so the sedimentation method essentially is a mass average method.

Embodiments of the present invention are directed to methods of processing deinking residue (DIR) to the recover and re-use the minerals of the DIR. In some embodiments, the DIR comprises at least 10 wt % (percent by weight or percent by mass), at least 15 wt %, least 20 wt %, at least 25 wt %, at least 30 wt %, or at least 35 wt % water. In some embodiments, the DIR comprises not more than 85 wt %, not more than 80 wt %, not more than 75 wt %, not more than 70 wt %, or not more than 50 wt % water. Embodiments of the invention encompass any combination of the above lower and upper limits of wt % water in the DIR.

As noted above, the recycling of wastepaper involves separation of usable pulp fiber from the other components of the wastepaper, resulting in the desired product, deinked pulp (DIP), and a composite waste material, deinking residue (DIR). The DIR must be disposed or re-used in some fashion. DIR is comprised of three primary components: 1) fibers and other organic species, 2) inorganic species including minerals that are present as filling or coating pigments in the wastepaper, and 3) water. Common mineral fillers currently used in paper are calcium carbonate ($CaCO_3$), used in printing and writing papers, and kaolin clay ($Al_2Si_2O_5(OH)_4$), used in coated paper. Thus, calcium carbonate and clay are the main inorganic components of most DIR. Other minerals that may be present in the DIR include, without limitation, Anatase ($TiO_2$), Talc, Rutile ($TiO_2$), and α-Quartz. The DIR may also include some amorphous material.

The DIR, which has a useful calorific value, is often burned to produce energy and steam. This simultaneously reduces the mass of solid waste that must be disposed or reused and converts it entirely to a mixture of inorganic minerals in an essentially dry state. However, at the temperatures of combustion employed in a typical DIR-fired boiler, calcium carbonate and kaolin clay will react to form predominantly calcium aluminosilicate minerals such as, without limitation, anorthite ($CaAl_2Si_2O_8$) and gehlenite ($Ca_2Al[AlSiO_7]$). Such minerals generally do not exhibit the whiteness or brightness that is desirable if the intended re-use is as a pigment in paper. They are also very hard and abrasive. Thus, further processing may be needed.

Surprisingly, it was found that if the ash from the incineration or combustion of DIR, as determined on a dry basis, includes at least 25 wt % CaO, as determined by X-ray diffraction (XRD), and the sum of the materials containing Ti, Al, and Si, expressed as a weight %, is about 25% to 35%, the ash may be used directly process to produce a composite mineral that includes, as part of its composition, precipitated calcium carbonate (PCC), and the process does not require wet milling. As used herein, "wet milling" refers to particle size reduction of a material when the material is suspended in a solvent, such as, without limitation, water. The term "milling" may also be referred to as grinding, or comminuting (or comminution), and may also be referred to as attrited (or attrition). When an ash of such composition is used, the process employed to produce the PCC-mineral composites will incur low product losses during post-reaction screening, and the composite mineral products will exhibit a well-defined and controlled particle shape (morphology) which is clustered scalenohedral, controlled average particle size, narrow particle size distribution (PSD) and acceptable abrasivity, making them useful as pigments in the production of paper. In some embodiments, the abrasion of the PCC-mineral composite particles is less than 6 mg as measured using the Einlehner AT 2000 method.

The need to determine ash composition by X-ray diffraction is an important feature of the embodiments of the current invention. Typically the composition of the ash from the burning of the DIR, which are also known as boiler ashes, and are sometimes called fly ashes, is determined by an analytical method known as X-ray fluourescence (XRF). Using the method of XRF, ash is dissolved in acid, and the total concentration of various elemental species—calcium, magnesium, aluminum, silicon, etc.—is determined and expressed as the oxides of those elements. Thus, total calcium measured using XRF will be expressed entirely as CaO, even though it is possible that species may not in fact be present at all. The calcium may actually exist in various mineral forms, which may or may not include calcium oxide (CaO), calcium carbonate ($CaCO_3$), calcium silicate ($Ca_2SiO_4$), gehlenite ($Ca_2Al[AlSiO7]$), and others. XRF data can easily mislead one into believing an ash being analyzed contains calcium oxide in high concentration, when in fact there may be none.

Embodiments of the invention are directed to processes that begin with obtaining ash of at least 25 wt % CaO, as determined by X-ray diffraction (XRD), where the wt % refers to wt % on a dry basis (percent by weight on a dry basis). As used herein, "ash" will refer to the solid product of combustion or incineration of a composite material, combination of materials, or both, comprising both organics and inorganics. In preferred embodiments, the ash is the solid product of incineration of DIR. In some embodiments, the ash is the solid product of incineration of DIR where no source calcium is added to the wet DIR prior to, concurrent with, or both prior to and concurrent with, incineration. As used herein, "where no source calcium is added," encompasses addition of any material including calcium in any form, such as and without limitation, elemental calcium, a mineral including calcium, a compound including calcium, a substance including dissolved calcium, a solution including dissolved calcium, calcium ions, or a combination thereof, and a slurry or suspension of calcium, calcium ions, or a combination thereof. Non-limiting specific examples of calcium sources include CaO (also called quicklime), $Ca(OH)_2$, and $CaCO_3$ (also called limestone or calcite). In some embodiments, the wt % CaO, as determined by XRD and on a dry basis, is at least 25 wt %, at least 30 wt %, at least 35 wt %, or at least 40 wt %. In some embodiments, the wt % CaO in the ash, as determined by XRD and on a dry basis, is not more than 80 wt %, not more than 75 wt %, not more than 70 wt %, or not more than 60 wt %. Embodiments of the present invention encompass any combination of the above upper and lower limits for the wt % CaO as determined by XRD and as determined on a dry basis.

In some embodiments, the sum of the components of the ash including the elements aluminum (Al), silicon (Si), and Titanium (Ti), is not more than 35 wt %, not more than 30 wt %, not more than 25 wt %, not more than 20 wt %, or not more than 15 wt %, where all wt % is on a dry basis. As used herein, each of the phrases, "the sum of the components including the elements aluminum (Al), silicon (Si), and Titanium (Ti)" and "the sum of the components comprising the elements aluminum (Al), silicon (Si), and Titanium (Ti)," refers to the sum of any elemental aluminum (Al), silicon (Si), and Titanium (Ti), and any minerals, other compounds, or both, including one or more members of the group consisting of aluminum (Al), silicon (Si), and Titanium (Ti). As an example, for the following mixture: Lime (CaO) 70 wt %; Gehlenite ($Ca_2Al_2SiO_7$) 15 wt %; Anorthite ($CaAl_2Si_2O_8$) 10 wt %; Perovskite ($CaTiO_3$) 2.5 wt %; and Microcline ($KAlSi_3O_8$) 2.5 wt %; the sum would be 15+10+2.5+2.5=30 wt %. In some embodiments, the sum of the components of the ash including the elements aluminum (Al), silicon (Si), and Titanium (Ti), is, on a dry basis, not less than 0.01 wt %, not less than 0.1 wt %, or not less than 0.2 wt %. Embodiments of the present invention encompass any combination of the above upper and lower limits for the sum of the components of the ash, express in wt % on a dry basis, including the elements aluminum (Al), silicon (Si), and Titanium (Ti). In some embodiments, the wt % of the components including one or more members of the group of elements aluminum (Al), silicon (Si), and Titanium (Ti) is determined by XRD.

In some embodiments, the composition of the ash is of a CaO and $CaCO_3$ composition such that, on a dry basis, the sum of the CaO wt % and the $CaCO_3$ wt %, each of which is determined by XRD, is at least 50 wt %, where the wt % refers to wt % on a dry basis. In some embodiments, the sum of the wt % CaO and $CaCO_3$, as determined by XRD, is at least 50 wt %, at least 55 wt %, at least 60 wt %, at least 65 wt %, at least 70 wt %, at least 75 wt %, at least 80 wt %, or at least 85 wt %, where wt % is wt % on a dry basis. In some embodiments, the sum of the wt % CaO and $CaCO_3$, as determined by XRD, is not more than 99 wt %, not more than 99.9 wt %, not more than 99.999 wt %, or not more than 99.99999 wt %, where wt % is wt % on a dry basis. Embodiments of the present invention encompass any combination of the above upper and lower limits for the sum of the wt %, on a dry basis, of the sum of CaO and $CaCO_3$.

The ash exhibiting the preferred composition described above may be produced in various ways. In some embodiments, through careful selection of the wastepaper fed to the deinking process the composition of mineral pigments in the paper may be controlled such that, when the deinking residue is combusted, the resulting ash exhibits the preferred composition. In some embodiments, the ash is the product of incinerating a wastepaper deink residue, the incineration occurring at a temperature of at least 800° C., at least 850° C., at least 900° C., at least 1000° C., or at least 1100° C. In some embodiments, the incineration does not exceed a temperature of 1500° C.

The next step, after obtaining or providing the ash, is to form an aqueous slurry of ash particles. Optionally, the ash may be dry milled. In some embodiments, the ash is not subjected to any size reduction prior to forming the slurry. In other embodiments, the ash is subjected to dry milling prior to formation of the slurry. Dry milling refers to reduction in particle size of the material without addition of a solvent, such as and without limitation, water. Non-limiting examples of dry milling include attrition mills, jet mills, and impact mills. A non-limiting example an impact mill is a hammer mill. In some embodiments, the dry milling is not more than 150 kWh per ton of dry ash, not more than 100 kWh per ton of dry ash, not more than 75 kWh per ton of dry ash, not more than 60 kWh per ton of dry ash, not more than 50 kWh per ton of dry ash, not more than 40 kWh per ton of dry ash, not more than 25 kWh per ton of dry ash, or not more than 15 kWh per ton of dry ash. In any of the embodiments in which dry milling is executed, the dry milling may utilize at least 2.5 kWh per ton of dry ash.

Formation of the slurry involves addition of the ash particles, whether or not dry milled, to water, an aqueous solution, or an aqueous dispersion, under agitation. Agitation is sufficient to form a slurry of the particles if there is not significant (not more than 10 wt % of ash particles added) settling of the particles at the bottom of the vessel. Agitation may be accomplished by methods well known in the art. In some embodiments, the slurry includes at least 5 wt %, at least 10 wt %, at least 12 wt %, or at least 15 wt % ash particles. In some embodiments, the slurry includes not more than 35 wt %, not more than 30 wt %, not more than 25 wt %, or not more than 20 wt % of the ash particles. In preferred embodiments, the slurry comprises 15 wt % to 20 wt % ash particles. Embodiments of the present invention encompass any combination of the above upper and lower limits of the wt % ash particles in the slurry. In some embodiments, other materials may be added to the slurry prior to, concurrent with, after, or any combination of one or more of prior to, concurrent with, and after, addition of the ash particles. In some embodiments, the other materials do not include calcium in any form. In some embodiments, materials which are sources of calcium may be added to the water used in forming the slurry, to the slurry, or both. In some embodiments, the other materials that are not sources of calcium are not more than 5 wt % of the slurry when all materials have been added to the slurry.

In some embodiments, the water used for the slurry may be at a pH of about 5.5 to 7.0. As noted above, in some embodiments, other sources of calcium are not added to the slurry. However, most water has some calcium present. In some embodiments, the water used in forming the slurry (whether the water used to form an aqueous solution or an aqueous dispersion to which ash particles are added, or the water to which ash particles are added) includes not more than 500 mg/liter, not more than 400 mg/liter, not more than 300 mg/liter, not more than 200 mg/liter, not more than 150 mg/liter, or not more than 100 mg/liter calcium (expressed as elemental calcium). In some embodiments, there is no calcium added to the water. Addition of calcium includes addition of calcium in any form. In some embodiments, the water source is mill process water that has been recycled from another point in the paper making operation.

After the slurry is formed, the aqueous slurry is carbonated. Prior to the initiation of the carbonation, the aqueous slurry may continue to be agitated for a period of time. In some embodiments, the aqueous slurry is subjected to a agitation for a time period of 30 minutes to 24 hours, 12 hours to 24 hours, 30 minutes to 120 minutes, 2 hours to 12 hours, 2 hours to 8 hours, 8 hours to 24 hours, 4 hours to 12 hours, 4 hours to 24 hours, 60 minutes to 120 minutes, 30 minutes to 12 hours, or 60 minutes to 8 hours prior to initiation of the carbonation of the aqueous slurry.

Carbonation may be accomplished by bubbling a gas including carbon dioxide gas (which may be ~100% carbon dioxide) though the ash slurry under agitation for a sufficient period of time for a substantial fraction (at least 90 wt %, at least 95 wt %, or at least 98 wt %) of the CaO to react with water, dissolve, and then react with the $CO_2$, the carbonate anion ($CO_3^{2-}$), or both. In some embodiments, the carbonation continues until the pH of the system falls to about 9. In some embodiments, the carbonation continues until the pH falls to about 8. In some embodiments, the carbonation is accomplished in a time period of about 30 minutes to 360 minutes, or 60 minutes to 150 minutes. The temperature during reaction may be any which is suitable to the production of precipitated calcium carbonate (PCC) using conventional methods. For example, the temperature may be between 20° C. and 50° C. A non-limiting example is about 35° C.

Other reagents capable of delivering a carbonate anion ($CO_3^{2-}$) may also be used to effect carbonation of the ash. In some embodiments, the other reagent capable of delivering a carbonate anion is not also a source of calcium (does not contain calcium). In some embodiments, carbonation comprises executing an operation comprising bubbling a gas including $CO_2$ through the aqueous slurry under agitation. The gas may be pure $CO_2$, substantially pure $CO_2$ (at least 95 volume %), or air, nitrogen, another gas, or a combination thereof, including $CO_2$, such as, without limitation, 5 to 95 volume % $CO_2$. In preferred embodiments, air with 10 volume % to 25 volume % $CO_2$ is used. One of skill in the art can determine the gas flow rate.

Following reaction, in some embodiments, the product slurry is screened through 325 mesh (U.S. Standard Sieve) to remove oversize, and the pH of the product passing through the screen is adjusted with a gas including $CO_2$ (such as but not limited to those described above) to about 9. In some embodiments, the product slurry is screened through a 325 Tyler standard mesh before the product passing through the sieve is subjected to pH adjustment as described above.

In some embodiments, the final product, the formed composite precipitated calcium carbonate particles, includes at least 35 wt % of the ash, at least 40 wt % of the ash, or at least 50 wt % of the ash. In some embodiments, the at least 60 wt % of the ash, at least 70 wt % of the ash, or at least 75 wt % of the ash is incorporated into the formed composite precipitated calcium carbonate particles.

The resulting product is composite precipitated calcium carbonate particles also referred to as composite mineral particles. The composite PCC particles comprise other minerals from the ash which are surrounded by, partially surrounded by, embedded in, or any combination thereof in precipitated calcium carbonate (PCC). The composite PCC particles exhibit a well-defined and controlled particle shape (morphology), controlled average particle size, narrow particle size distribution (PSD) and acceptable abrasivity, making them useful as pigments in the production of paper. In some embodiments, the morphology of the composite precipitated calcium carbonate particles is clustered scalenohedral. In some embodiments, the abrasion of the composite precipitated calcium carbonate particles is less than 6 mg as measured using the Einlehner AT 2000 method.

In some embodiments, the d90 of the formed composite precipitated calcium carbonate particles on a mass or weight average particle size distribution as measured by a sedimentation method is in the range of 6-7 µm and the d50 is in the range of 3 µm-4 µm, 3.5 µm-4.5 µm, or 2 µm-3 µm. In other embodiments, the d90 of the formed composite precipitated calcium carbonate particles on a mass or weight average particle size distribution as measured by a sedimentation method is in the range of 5 µm-6 µm and the d50 is in the range of 2.5 µm-3.5 µm, 3.5 µm-4.0 µm, or 2 µm-3.5 µm. In other embodiments, the d90 of the formed composite precipitated calcium carbonate particles on mass or weight average particle size distribution as measured by a sedimentation method is in the range of 4 µm-5 µm and the d50 is in the range of 3 µm-4 µm, 3.5 µm-4.5 µm, or 2 µm-3 µm. In other embodiments, the d90 of the formed composite precipitated calcium carbonate particles on mass or weight average particle size distribution as measured by a sedimentation method is in the range of 4 µm-5 µm and the d50 is in the range of 1.5 µm-2.5 µm, 2.5 µm-3.0 µm, or 1 µm-2.5 µm. In other embodiments, the d90 of the formed composite precipitated calcium carbonate particles on mass or weight average particle size distribution as measured by a sedimentation method is in the range of 3 µm-4 µm and the d50 is in the range of 1 µm-2 µm, 0.5 µm-1.5 µm, or 1.5 µm-2.5 µm. In other embodiments, the d90 of the formed composite precipitated calcium carbonate particles on mass or weight average particle size distribution as measured by a sedimentation method is in the range of 2.5 µm-3.5 µm and the d50 is in the range of 0.5 µm-1.25 µm, 0.8 µm-1.6 µm, or 1.0 µm-2.0 µm. In other embodiments, the d90 of the formed composite precipitated calcium carbonate particles on mass or weight average particle size distribution as measured by a sedimentation method is in the range of 2 µm-3 µm and the d50 is in the range of 0.1 µm-0.5 µm, 0.75 µm-1.25 µm, or 1.25 µm-1.75 µm. In some embodiments, the sedimentation method of determining the particle size distribution is an X-ray sedimentation method.

In some embodiments, the ratio of the d90 to the d10 (polydispersity) of the formed composite precipitated calcium carbonate particles, where d90 and d10 are from the mass or weight average particle size distribution as measured by a sedimentation method is not more than 18, not more than 15, not more than 12, not more than 10, not more than 9, not more than 8, not more than 7, not more than 6, not more than 5, or not more than 4. In some embodiments, the ratio of the d90 to the d10 of the formed composite precipitated calcium carbonate particles, where d90 and d10 are from a mass or a weight average particle size distribution as measured by a sedimentation method is not less than 1.5, not less than 1.25, or not less than 1.05. Embodiments of the present invention encompass any combination of the upper and lower limits of the ratio of the d90 to the d10.

In some embodiments, the final product, the formed composite precipitated calcium carbonate particles, of any of the above particle sizes, polydispersities, or both, includes at least 35 wt % of the ash, at least 40 wt % of the ash, or at least 50 wt % of the ash initially added. In some embodiments, at least 60 wt % of the ash, at least 70 wt % of the ash, or at least 75 wt % of the ash initially added is incorporated into the formed composite precipitated calcium carbonate particles, which may be of any of the above particle sizes, polydispersities, or potentially a combination of one of the above sizes and one of the above polydispersities.

In some embodiments, the only calcium in the entire process is from the ash particles, and the nominal amount from the water (up to 500 mg/liter, see above) used in the forming the slurry of ash particles. In other embodiments, the above described process is modified such that additional calcium is added either to the DIR, to the ash particle slurry, or both. In those embodiments in which additional calcium is added, the ratio of the weight equivalent of elemental calcium added to the weight of ash may be not more than 1, not more than 0.75, not more than 0.5, not more than 0.35, or not more than 0.25.

There are several ways to add sources of calcium. An example of the manner of addition of calcium is increasing the weight fraction of calcium-containing minerals in the wet deinking residue by addition of calcium-containing minerals to the wet residue prior to, during, or both prior to and during combustion or incineration. Specific examples include, without limitation, by adding calcium carbonate as fine ground limestone to the wet deinking residue prior to combustion; adding dry calcium oxide (CaO) to the wet deinking residue prior to combustion; and adding granular dry lime hydrate ($Ca(OH)_2$) containing a minimal molar excess of water relative to calcium oxide to the wet deinking residue prior to combustion. Another manner of adding calcium is combining the dry ash which contains calcium oxide (CaO) resulting from the combustion of deinking residue with additional dry calcium oxide, and the dry mixture is subsequently combined with water, an aqueous solution, or an aqueous dispersion, to effect hydration of the calcium oxide, and to form a slurry of the ash particles. Another example is combining the ash slurry containing calcium hydroxide with a calcium hydroxide slurry, or combining the water used for form the ash particle slurry with a calcium hydroxide slurry.

In some embodiments of the invention, the composite precipitated calcium carbonate particles that are produced by carbonation of the ash slurry are combined with conventional PCC such that the composite precipitated calcium carbonate particles comprise from 10 to 100% by weight of the mixture.

Some embodiments of the invention are described in the following labeled clauses:

Clause 1. A process for making composite precipitated calcium carbonate particles, the process comprising:
  providing ash particles, at least 25 wt % of the ash particles, on a dry basis, comprising CaO;
    wherein the wt % of CaO is determined by X-ray diffraction;
    and wherein the ash particles are the product of incineration; forming an aqueous slurry of the ash particles,
    wherein the water used to form the slurry, prior to addition of any optional additives, comprises not more than 500 mg/liter elemental calcium;
  and
  carbonating the aqueous slurry to form composite precipitated calcium carbonate particles;
  wherein no wet milling is performed; and
  wherein either
    the only sources of calcium are from the ash particles and the water used in forming the slurry of the ash particles; and no source calcium is added to either of the material to be incinerated, or to the incinerator;

or a source of calcium is added to the material to be incinerated, to the incinerator, to both the incinerator and material to be incinerated, at another point in the process, or a combination thereof, such that the ratio of the weight of calcium added, expressed as elemental calcium, to the weight of ash, is not more than 1.0.

Clause 2. The process of clause 1, wherein a source of calcium is added.

Clause 3. The process of clause 2, wherein the ratio of the weight of calcium added, expressed as elemental calcium, to the weight of ash is not more than 0.75.

Clause 4. The process of clause 2, wherein the ratio of the weight of calcium added, expressed as elemental calcium, to the weight of ash is not more than 0.5.

Clause 5. The process of clause 2, wherein additional calcium is added at a weight ratio of calcium added, expressed as elemental calcium, to the weight of ash that is not more than 0.35.

Clause 6. The process of clause 2, wherein the ratio of the weight of calcium added, expressed as elemental calcium, to the weight of ash is not more than 0.25.

Clause 7. The process of clause 2, wherein a source of calcium is added to the material to be incinerated, to the incinerator, or both.

Clause 8. The process of clause 2, wherein a source of calcium is added to the ash prior to forming the slurry, to the slurry, to the water, aqueous solution, or aqueous dispersion used to form the slurry, or a combination thereof.

Clause 9. The process of clause 2, wherein a source of calcium is added to the material to be incinerated, to the incinerator, or both; and wherein a source of calcium is added to the ash prior to forming the slurry, to the slurry, to the water, aqueous solution, or aqueous dispersion, used to form the slurry, or a combination thereof.

Clause 10. The process of clause 1, wherein the only sources of calcium are from the ash particles and the water used in forming the slurry of the ash; and no source calcium is added to either of the material to be incinerated, or to the incinerator.

Clause 11. The process of any one of clauses 1-10, wherein the provided ash particles comprise, on a dry basis, at least 30 wt % CaO as determined by XRD.

Clause 12. The process of any one of clauses 1-11, wherein the provided ash particles comprise, on a dry basis, at least 35 wt % CaO as determined by XRD.

Clause 13. The process of any one of clauses 1-12, wherein the provided ash particles comprise, on a dry basis, at least 40 wt % CaO as determined by XRD.

Clause 14. The process of any one of clauses 1-13, wherein the provided ash particles comprise, on a dry basis, not more than 80 wt % CaO as determined by XRD.

Clause 15. The process of any one of clauses 1-14, wherein the provided ash particles comprise, on a dry basis, not more than 75 wt % CaO as determined by XRD.

Clause 16. The process of any one of clauses 1-15, wherein the provided ash particles comprise, on a dry basis, not more than 70 wt % CaO as determined by XRD.

Clause 17. The process of any one of clauses 1-16, wherein the provided ash particles comprise, on a dry basis, not more than 60 wt % CaO as determined by XRD.

Clause 18. The process of any one of clauses 1-17, wherein, for the provided ash particles, the sum of the components comprising the elements aluminum (Al), silicon (Si), and Titanium (Ti), is not more than 35 wt % on a dry basis.

Clause 19. The process of any one of clauses 1-18, wherein, for the provided ash particles, the sum of the components comprising the elements aluminum (Al), silicon (Si), and Titanium (Ti), is not more than 25 wt % on a dry basis.

Clause 20. The process of any one of clauses 1-19, wherein, for the provided ash particles, the sum of the components comprising the elements aluminum (Al), silicon (Si), and Titanium (Ti), is not more than 20 wt % on a dry basis.

Clause 21. The process of any one of clauses 1-20, wherein, for the provided ash particles, the sum of the components comprising the elements aluminum (Al), silicon (Si), and Titanium (Ti), is not more than 15 wt % on a dry basis.

Clause 22. The process of any one of clauses 18-21, wherein the sum of the components comprising the elements aluminum (Al), silicon (Si), and Titanium (Ti) is determined from XRD measurements.

Clause 23. The process of any one of clauses 1-22, wherein, for the provided ash particles, the sum of the CaO wt % and the $CaCO_3$ wt %, each determined by XRD, is at least 50 wt % on a dry basis.

Clause 24. The process of any one of clauses 1-23, wherein, for the provided ash particles, the sum of the CaO wt % and the $CaCO_3$ wt %, each as determined by XRD, is at least 55 wt % on a dry basis.

Clause 25. The process of any one of clauses 1-24, wherein, for the provided ash particles, the sum of the CaO wt % and the CaCO3 wt %, each as determined by XRD, is at least 60 wt % on a dry basis.

Clause 26. The process of any one of clauses 1-25, wherein, for the provided ash particles, the sum of the CaO wt % and the $CaCO_3$ wt %, each as determined by XRD, is at least 65 wt % on a dry basis.

Clause 27. The process of any one of clauses 1-26, wherein, for the provided ash particles, the sum of the CaO wt % and the $CaCO_3$ wt %, each as determined by XRD, is at least 70 wt % on a dry basis.

Clause 28. The process of any one of clauses 1-27, wherein, for the provided ash particles, the sum of the CaO wt % and the $CaCO_3$ wt %, each as determined by XRD, is at least 75 wt % on a dry basis.

Clause 29. The process of any one of clauses 1-28, wherein, for the provided ash particles, the sum of the CaO wt % and the $CaCO_3$ wt %, each as determined by XRD, is at least 80 wt % on a dry basis.

Clause 30. The process of any one of clauses 1-29, wherein, for the provided ash particles, the sum of the CaO wt % and the $CaCO_3$ wt %, each as determined by XRD, is at least 85 wt % on a dry basis.

Clause 31. The process of any one of clauses 1-30, wherein, for the provided ash particles, the sum of the CaO wt % and the $CaCO_3$ wt %, each as determined by XRD, is not more than 99.99999 wt % on a dry basis.

Clause 32. The process of any one of clauses 1-31, wherein, for the provided ash particles, the sum of the CaO wt % and the $CaCO_3$ wt %, each as determined by XRD, is not more than 99.999 wt % on a dry basis.

Clause 33. The process of any one of clauses 1-32, wherein, for the provided ash particles, the sum of the CaO wt % and the $CaCO_3$ wt %, each as determined by XRD, is not more than 99.9 wt % on a dry basis.

Clause 34. The process of any one of clauses 1-33, wherein, for the provided ash particles, the sum of the CaO wt % and the $CaCO_3$ wt %, each as determined by XRD, is not more than 99 wt % on a dry basis.

Clause 35. The process of any one of clauses 1-34, wherein the ash is the product of incinerating a material comprising a wastepaper deink residue.

Clause 36. The process of any one of clauses 1-35, wherein the provided ash particles have been subjected to an operation comprising dry milling of the ash prior to the formation of a slurry.

Clause 37. The process of clause 36, wherein the dry milling is not more than 150 kWh per ton of dry ash.

Clause 38. The process of clause 36, wherein the dry milling is not more than 100 kWh per ton of dry ash.

Clause 39. The process of clause 36, wherein the dry milling is not more than 75 kWh per ton of dry ash.

Clause 40. The process of clause 36, wherein the dry milling is not more than 60 kWh per ton of dry ash.

Clause 41. The process of clause 36, wherein the dry milling is not more than 50 kWh per ton of dry ash.

Clause 42. The process of clause 36, wherein the dry milling is not more than 40 kWh per ton of dry ash.

Clause 43. The process of clause 36, wherein the dry milling is not more than 25 kWh per ton of dry ash.

Clause 44. The process of clause 36, wherein the dry milling is not more than 15 kWh per ton of dry ash.

Clause 45. The process of clause 36-44, wherein the dry milling is not less than 2.5 kWh per ton of dry ash.

Clause 46. The process of any one of clauses 1-45, wherein the ash is the product of incinerating a material comprising wastepaper deink residue, the incineration occurring at a temperature of at least 800° C.

Clause 47. The process of any one of clauses 1-46, wherein the ash is the product of incinerating a material comprising wastepaper deink residue, the incineration occurring at a temperature of at least 850° C.

Clause 48. The process of any one of clauses 1-47, wherein the ash is the product of incinerating a material comprising a wastepaper deink residue, the incineration occurring at a temperature of at least 900° C.

Clause 49. The process of any one of clauses 1-48, wherein the ash is the product of incinerating a material comprising a wastepaper deink residue, the incineration occurring at a temperature of at least 1000° C.

Clause 50. The process of any one of clauses 1-49, wherein the wastepaper deink residue is incinerated at a temperature of at least 1100° C.

Clause 51. The process of any one of clauses 35 and 46-50, wherein the wastepaper deink residue is incinerated at a temperature of not exceeding least 1500° C.

Clause 52. The process of any one of clauses 1-51, wherein forming an aqueous slurry of the ash particles comprises executing an operation comprising adding ash particles to water, an aqueous solution, or an aqueous suspension, under agitation.

Clause 53. The process of clause 52, wherein the formed aqueous slurry comprises at least 5 wt % ash particles.

Clause 54. The process of clause 52, wherein the formed aqueous slurry comprises at least 10 wt % ash particles.

Clause 55. The process of clause 52, wherein the formed aqueous slurry comprises at least 12 wt % ash particles.

Clause 56. The process of clause 52, wherein the formed aqueous slurry comprises at least 15 wt % ash particles.

Clause 57. The process of any one of clauses 52-56, wherein the formed aqueous slurry comprises not more than 35 wt % ash particles.

Clause 58. The process of any one of clauses 52-56, wherein the formed aqueous slurry comprises not more than 30 wt % ash particles.

Clause 59. The process of any one of clauses 52-56, wherein the formed aqueous slurry comprises not more than 25 wt % ash particles.

Clause 60. The process of any one of clauses 52-56, wherein the formed aqueous slurry comprises not more than 20 wt % ash particles.

Clause 61. The process of any one of clauses 1-60, wherein the water used in forming the aqueous slurry, prior to the addition of any additives, has a pH in the range of 5.5 to 7.0, is recycled water from another process, or a combination thereof.

Clause 62. The process of any one of clauses 1-61, wherein the water used in forming the aqueous slurry, prior to the addition of any additives, comprises not more than 400 mg/liter elemental calcium.

Clause 63. The process of any one of clauses 1-62, wherein the water used in forming the aqueous slurry, prior to the addition of any additives, comprises not more than 300 mg/liter elemental calcium.

Clause 64. The process of any one of clauses 1-63, wherein the water used in forming the aqueous slurry, prior to the addition of any additives, comprises not more than 200 mg/liter elemental calcium.

Clause 65. The process of any one of clauses 1-64, wherein the water used in forming the aqueous slurry, prior to the addition of any additives, comprises not more than 150 mg/liter elemental calcium.

Clause 66. The process of any one of clauses 1-65, wherein the water used in forming the aqueous slurry, prior to the addition of any additives, comprises not more than 100 mg/liter elemental calcium.

Clause 67. The process of any one of clauses 1-66, furthering comprising continuing to agitate the slurry of the ash particles for a time period of 30 minutes to 24 hours prior to carbonating the slurry.

Clause 68. The process of clause 67, wherein the time period is 30 minutes to 12 hours.

Clause 69. The process of clause 67, wherein the time period is 12 hours to 24 hours.

Clause 70. The process of clause 67, wherein the time period is 30 minutes to 120 minutes.

Clause 71. The process of clause 67, wherein the time period is 2 hours to 12 hours.

Clause 72. The process of clause 67, wherein the time period is 2 hours to 8 hours.

Clause 73. The process of clause 67, wherein the time period is 8 hours to 24 hours.

Clause 74. The process of clause 67, wherein the time period is 4 hours to 12 hours.

Clause 75. The process of clause 67, wherein the time period is 4 hours to 24 hours.

Clause 76. The process of clause 67, wherein the time period is 60 minutes to 120 minutes.

Clause 77. The process of clause 67, wherein the time period is 60 minutes to 8 hours.

Clause 78. The process of any one of clauses 1-77, wherein carbonating the aqueous slurry comprises executing an operation comprising bubbling a gas including carbon dioxide though the ash slurry under agitation.

Clause 79. The process of clause 78, wherein the gas is at least 95 volume % carbon dioxide.

Clause 80. The process of clause 79, wherein the gas is at least 99 volume % carbon dioxide.

Clause 81. The process of clause 78, wherein the gas is a mixture of carbon dioxide and air with at least 5 volume % carbon dioxide and at most 95 volume % carbon dioxide.

Clause 82. The process of clause 81, wherein the gas is a mixture of carbon dioxide and air with at least 10 volume % carbon dioxide and at most 25 volume % carbon dioxide.

Clause 83. The process of any one of clauses 1-82, wherein carbonation occurs until the system pH falls to about 9.

Clause 84. The process of any one of clauses 1-82, wherein carbonation occurs until the system pH falls to about 8.

Clause 85. The process of any one of clauses 1-82, wherein carbonation occurs for a sufficient period of time for a substantial fraction of the CaO to react with water, dissolve, and then react with the carbon dioxide ($CO_2$), the carbonate anion ($CO_3^2$), or both.

Clause 86. The process of any one of clauses 1-85, wherein after carbonation, the formed composite precipitated calcium carbonate particles are passed through a U.S. standard 325 sieve, and the pH is adjusted to pH 9.

Clause 87. The process of clause 86, wherein the formed composite precipitated calcium carbonate particle have a d90 on a mass average particle size distribution as measured by a sedimentation method in the range of 6-7 μm and the d50 is in the range of 3 μm-4 μm, 3.5 μm-4.5 μm, or 2 μm-3 μm.

Clause 88. The process of clause 86, wherein the formed composite precipitated calcium carbonate particles have a d90 on a mass average particle size distribution as measured by a sedimentation method in the range of 5 μm-6 μm and the d50 is in the range of 2.5 μm-3.5 μm, 3.5 μm-4.0 μm, or 2 μm-3.5 μm.

Clause 89. The process of clause 86, wherein the formed composite precipitated calcium carbonate particles have a d90 on a mass average particle size distribution as measured by a sedimentation method in the range of 4 μm-5 μm and the d50 is in the range of 3 μm-4 μm, 3.5 μm-4.5 μm, or 2 μm -3 μm.

Clause 90. The process of clause 86, wherein the formed composite precipitated calcium carbonate particles have a d90 on a mass average particle size distribution as measured by a sedimentation method in the range of 4 μm-5 μm and the d50 is in the range of 1.5 μm-2.5 μm, 2.5 μm-3.0 μm, or 1 μm-2.5 μm.

Clause 91. The process of clause 86, wherein the formed composite precipitated calcium carbonate particles have a d90 on a mass average particle size distribution as measured by a sedimentation method in the range of 3 μm-4 μm and the d50 is in the range of 1 μm-2 μm, 0.5 μm-1.5 μm, or 1.5 μm-2.5 μm.

Clause 92. The process of clause 86, wherein the formed composite precipitated calcium carbonate particles have a d90 on a mass average particle size distribution as measured by a sedimentation method in the range of 2.5 μm-3.5 μm and the d50 is in the range of 0.5 μm-1.25 μm, 0.8 μm-1.6 μm, or 1.0 μm-2.0 μm.

Clause 93. The process of clause 86, wherein the formed composite precipitated calcium carbonate particles have a d90 on a mass average particle size distribution as measured by a sedimentation method in the range of 2 μm-3 μm and the d50 is in the range of 0.1 μm-0.5 μm, 0.75 μm-1.25 μm, or 1.25 μm-1.75 μm.

Clause 94. The process of any one of clauses 86-93, wherein the formed composite precipitated calcium carbonate particle have a ratio of d90 to d10, where d90 and d10 are from the mass average particles size distribution as measured by a sedimentation method, of not more than 18.

Clause 95. The process of any one of clauses 86-93, wherein the formed composite precipitated calcium carbonate particles have a ratio of d90 to d10, where d90 and d10 are from the mass average particle size distribution as measured by a sedimentation method, of not more than 15.

Clause 96. The process of any one of clauses 86-93, wherein the formed composite precipitated calcium carbonate particles have a ratio of d90 to d10, where d90 and d10 are from the mass average particle size distribution as measured by a sedimentation method, of not more than 12.

Clause 97. The process of any one of clauses 86-93, wherein the formed composite precipitated calcium carbonate particles have a ratio of d90 to d10, where d90 and d10 are from the mass average particle size distribution as measured by a sedimentation method, of not more than 10.

Clause 98. The process of any one of clauses 86-93, wherein the formed composite precipitated calcium carbonate particles have a ratio of d90 to d10, where d90 and d10 are from the mass average particle size distribution as measured by a sedimentation method, of not more than 9.

Clause 99. The process of any one of clauses 86-93, wherein the formed composite precipitated calcium carbonate particle have a ratio of d90 to d10, where d90 and d10 are from the mass average particle size distribution as measured by a sedimentation method, of not more than 8.

Clause 100. The process of any one of clauses 86-93, wherein the formed composite precipitated calcium carbonate particle have a ratio of d90 to d10, where d90 and d10 are from the mass average particle size distribution as measured by a sedimentation method, of not more than 7.

Clause 101. The process of any one of clauses 86-93, wherein the formed composite precipitated calcium carbonate particle have a ratio of d90 to d10, where d90 and d10 are from the mass average particle size distribution as measured by a sedimentation method, of not more than 6.

Clause 102. The process of any one of clauses 86-93, wherein the formed composite precipitated calcium carbonate particle have a ratio of d90 to d10, where d90 and d10 are from the mass average particle size distribution as measured by a sedimentation method, of not more than 5.

Clause 103. The process of any one of clauses 86-93, wherein the formed composite precipitated calcium carbonate particle have a ratio of d90 to d10, where d90 and d10 are from the mass average particle size distribution as measured by a sedimentation method, of not more than 4.

Clause 104. The process of any one of clauses 87-103, wherein the sedimentation method of determining the particle size distribution is an X-ray sedimentation method.

Clause 105. The process of any one of clauses 1-104, wherein at least 35 wt % of the ash is incorporated into the formed composite precipitated calcium carbonate particles.

Clause 106. The process of any one of clauses 1-105, wherein at least 40 wt % of the ash is incorporated into the formed composite precipitated calcium carbonate particles.

Clause 107. The process of any one of clauses 1-106, wherein at least 50 wt % of the ash is incorporated into the formed composite precipitated calcium carbonate particles.

Clause 108. The process of any one of clauses 1-107, wherein at least 60 wt % of the ash is incorporated into the formed composite precipitated calcium carbonate particles.

Clause 109. The process of any one of clauses 1-108, wherein at least 70 wt % of the ash is incorporated into the formed composite precipitated calcium carbonate particles.

While particular embodiments of the present invention have been shown and described, it will be obvious to those skilled in the art that changes and modifications can be made without departing from this invention in its broader aspects. Therefore, the claims are to encompass within their scope all such changes and modifications as fall within the true spirit and scope of this invention. Moreover, although individual aspects or features may have been presented with respect to one embodiment, a recitation of an aspect for one embodiment, or the recitation of an aspect in general, is intended to disclose its use in all embodiments in which that aspect or feature can be incorporated without undue experimentation. Also, embodiments of the present invention specifically encompass embodiments resulting from treating any dependent claim which follows as alternatively written in a multiple dependent form from all prior claims which possess all antecedents referenced in such dependent claim (e.g. each claim depending directly from claim 1 should be alternatively taken as depending from any previous claims).

What is claimed is:

1. A process for making composite precipitated calcium carbonate particles, the process comprising:
   providing ash, at least 25 wt % of the ash, on a dry basis, comprising CaO;
     wherein the wt % of CaO is determined by X-ray diffraction; and
     wherein the ash is the product of incineration of a material;
   forming an aqueous slurry of the ash,
     wherein the water used to form the slurry, prior to addition of any optional additives, comprises not more than 500 mg/liter elemental calcium;
     and wherein optional additives that are not sources of calcium comprise not more than 5 wt % of the slurry; and
   carbonating the aqueous slurry to form composite precipitated calcium carbonate particles;
   wherein no wet milling is performed; and
   wherein
     either
       the only sources of calcium are from the ash and the water used in forming the slurry of the ash, the water comprising not more than 500 mg/liter elemental calcium; and no source calcium is added to the material to be incinerated, or to the incinerator;
     or
       a source of calcium is added to the material to be incinerated, to the incinerator, to both the incinerator and material to be incinerated, at another point in the process, or a combination thereof, such that the ratio of the weight of calcium added, expressed as elemental calcium, to the weight of ash, is not more than 0.5.

2. The process of claim 1, wherein a source of calcium is added.

3. The process of claim 2, wherein the source of calcium is added to the material to be incinerated, to the incinerator, or both.

4. The process of claim 2, wherein the source of calcium is added to the ash prior to forming the slurry, to the slurry, to the water, aqueous solution, or aqueous dispersion used to form the slurry, or a combination thereof.

5. The process of claim 2, wherein the source of calcium is added to the material to be incinerated, to the incinerator, or both, and to the ash prior to forming the slurry, to the slurry, to the water, aqueous solution, or aqueous dispersion, used to form the slurry, or a combination thereof.

6. The process of claim 1, wherein the only sources of calcium are from the ash and the water used in forming the slurry of the ash, the water comprising not more than 500 mg/liter elemental calcium; and no source of calcium is added to either of the material to be incinerated, or to the incinerator.

7. The process of claim 1, wherein the provided ash comprises, on a dry basis, at least 30 wt % CaO as determined by XRD.

8. The process of claim 1, wherein, for the provided ash, the sum of the components comprising the elements aluminum (Al), silicon (Si), and Titanium (Ti), is not more than 25 wt % on a dry basis.

9. The process of claim 1, wherein, for the provided ash, the sum of the CaO wt % and the $CaCO_3$ wt %, each as determined by XRD, is at least 70 wt % on a dry basis.

10. The process of claim 1, wherein the material incinerated to form the ash comprises a wastepaper deink residue.

11. The process of claim 1, wherein the provided ash has been subjected to an operation comprising dry milling of the ash prior to the formation of a slurry.

12. The process of claim 11, wherein the dry milling is not more than 150 kWh per ton of dry ash.

13. The process of claim 11, wherein the dry milling is not more than 25 kWh per ton of dry ash.

14. The process of claim 1, wherein the material incinerated to form the ash comprises a wastepaper deink residue, and the material is incinerated at a temperature of at least 900° C.

15. The process of claim 14, wherein the material comprising the wastepaper deink residue is incinerated at a temperature not exceeding 1500° C.

16. The process of claim 1, wherein forming an aqueous slurry of the ash comprises executing an operation comprising adding ash to water, an aqueous solution, or an aqueous suspension, under agitation.

17. The process of claim 16, wherein the formed aqueous slurry comprises at least 5 wt % ash, and not more than 35 wt % ash.

18. The process of claim 1, wherein the water used in forming the aqueous slurry, prior to the addition of any additives, has a pH in the range of 5.5 to 7.0, is recycled water from another process, or a combination thereof.

19. The process of claim 1, wherein the water used in forming the aqueous slurry, prior to the addition of any additives, comprises not more than 400 mg/liter elemental calcium.

20. The process of claim 1, wherein carbonating the aqueous slurry comprises executing an operation comprising bubbling a gas comprising carbon dioxide through the ash slurry under agitation.

21. The process of claim 1, wherein carbonation occurs until the system pH falls to about 8.

22. The process of claim 1, wherein carbonation occurs for a sufficient period of time for a substantial fraction of the CaO to react with water, dissolve, and then react with the carbon dioxide ($CO_2$), the carbonate anion ($CO_3^{-2}$), or both.

23. The process of claim 1, wherein after carbonation, the formed composite precipitated calcium carbonate particles are passed through a U.S. standard 325 sieve, and the pH is adjusted to pH 9.

24. The process of claim 1, wherein at least 35 wt % of the ash is incorporated into the formed composite precipitated calcium carbonate particles.

25. The process of claim 1, wherein, for the provided ash, the sum of the components comprising the elements aluminum (Al), silicon (Si), and Titanium (Ti), is about 25 wt % to 35 wt % on a dry basis.

* * * * *